United States Patent [19]

Makimura et al.

[11] Patent Number: 5,303,656
[45] Date of Patent: Apr. 19, 1994

[54] MONORAIL TRAMCAR TYPE CONVEYOR

[75] Inventors: Katsuyoshi Makimura; Tatsuya Sakagami, both of Kobe, Japan

[73] Assignee: Daifuku Ltd., Osaka, Japan

[21] Appl. No.: 955,850

[22] Filed: Oct. 2, 1992

Related U.S. Application Data

[63] Continuation of Ser. No. 772,283, Oct. 7, 1991, abandoned.

[30] Foreign Application Priority Data

Oct. 15, 1990 [JP] Japan ................... 2-108194
Oct. 15, 1990 [JP] Japan ................... 2-108198

[51] Int. Cl.⁵ ............................................... B61B 13/00
[52] U.S. Cl. ....................................... 105/144; 104/119
[58] Field of Search ................. 104/93, 118, 119; 105/141, 144, 150, 156, 176

[56] References Cited

U.S. PATENT DOCUMENTS

| | | | |
|---|---|---|---|
| 2,731,922 | 1/1956 | Robb | 105/156 |
| 3,584,583 | 6/1971 | Cartwright | 104/119 X |
| 4,207,821 | 6/1980 | Beckert | 104/119 |
| 4,260,869 | 4/1981 | Slavens et al. | 104/119 X |
| 4,423,685 | 1/1984 | Kerckhoff | 104/119 X |
| 4,671,183 | 6/1987 | Fujita et al. | 104/93 |
| 4,905,605 | 3/1990 | Shishido et al. | 104/93 |
| 5,014,625 | 5/1991 | Murai et al. | 105/176 X |

FOREIGN PATENT DOCUMENTS

| | | | |
|---|---|---|---|
| 2320777 | 11/1974 | Fed. Rep. of Germany | 104/93 |
| 2224148 | 4/1990 | United Kingdom | 104/93 |

*Primary Examiner*—Douglas C. Butler
*Assistant Examiner*—S. Joseph Morano
*Attorney, Agent, or Firm*—Schweitzer Cornman & Gross

[57] ABSTRACT

The invention relates to a monorail tramcar type conveyor having a driven carriage connected to a free rolling carriage for traveling along the top of the rail. Both the driven and free carriages have a rectangular frame, from which vertical axis guide rollers are cantilevered so as to engage the sides of the rail. The top portion of the frames have a vertical opening which is surrounded by the frame, and the driven and free rolling wheels which ride on the top of the rail are loosely fitted into these openings on the respective driven and free rolling carriages.

6 Claims, 7 Drawing Sheets

MONORAIL TRAMCAR TYPE CONVEYOR

This is a continuing application of U.S. patent application Ser. No. 07/772,283 filed on Oct. 7, 1991, now abandoned.

FIELD OF THE INVENTION

The present invention relates to a conveyor having a monorail tramcar which is supported by, and movable along, a guide rail.

BACKGROUND OF THE INVENTION

Some conventional monorail conveyor structures have a wheeled unit that is detachably supported on the main body of the carriage. In these the main body of the carriage has a vertical support column located at one side of the guide rail, and upper and lower projected parts are provided integrally to extend from the upper and lower ends of the vertical support column to the upper and lower sides of the guide rail.

In that type of conveyor the upper extending part of the main body of the carriage usually has two front and rear arms independently of one another at the front and rear of the drive wheel and follower wheel of the conveying tramcar, and steering rollers with vertical axes are provided on the top and the bottom of these arms to contact the sides of the guide rail.

When a conveying tramcar of this kind carries large and heavy articles, the large load acts on the carriage and torsionally deforms the arms in the upper extending part of the main body of the carriage so that normal contact between the roller with the vertical aids and the guide rail is no longer possible, obstructing a smooth travel of the carriages, and damaging the arms or the rollers, or both.

In the known monorail tramcar type conveyors art the reduction gear of the drive wheel unit in the driven carriage, has the drive wheel attached to its output shaft. A motor is provided on the upper end of the main body of the driven carriage while the freely rolling carriage contains the follower wheel unit supporting the follower wheel from the upper end of the main body. Since the follower wheel unit that supports the follower wheel is smaller and lower than the reduction gear, a lower supporting unit is provided in this kind of conventional conveyor, for supporting the surface for holding the article to be conveyed from the side of the drive wheel unit (reduction gear), and provides a higher support unit for the surface that holds the article to be conveyed from the side of the follower wheel unit. The surface that holds the article to be conveyed, can be supported by the upper end of the drive wheel unit (reduction gear) and the upper end of the follower wheel unit, whereby front and rear surface supporting units are provided that hold the surface that holds the article to be conveyed. These that are different in structure and size from each other.

According to such conventional construction, since the two supporting units that have to be provided for supporting the surface that holds the article to be conveyed, are different in structure and size from each other, this results not only in increased costs, but construction requires two different supporting units to be provided in the respective positions.

The conveying tramcar of the prior art requires a control unit to electrically actuate the motor for the driven carriage and to provide a control signal, both from feed lines supplied through a pantograph collector located on the side of the conveying tramcar. Since the control unit is large and heavy in the known conveying tramcars, the control unit is mounted on the bottom of the surface that holds the article to be conveyed, which in turn is supported by the driven carriage and the freely rolling carriage.

Since the driven carriage and the freely rolling carriage are supported rotatably around vertical shafts relative to the surface that holds the article to be conveyed, so that the tramcar can travel smoothly on straight and curved routes, connecting cables between the motor of the driven carriage and the control unit at the side of the surface that holds the article to be conveyed and between the pantograph collector mounted from the driven carriage or the freely rolling carriage and the control unit, have to be so that they do not hinder a horizontal swinging motion which takes place between the carriages and the surface that holds the article to be conveyed. This increases the wiring costs, and the service life of the cables is short.

In this kind of conveyor, if the article to be conveyed which is placed on the base of supporting the same is longer than the distance between the powered carriage and the freely rolling carriage, an auxiliary carriage is connected through a connecting rod at least to either or both of the carriages to prevent the articles to be conveyed from colliding with each other when the tramcars are close to each other. That auxiliary carriage is equipped with a detector for detecting a stopped tramcar, thereby automatically to stop the next tramcar to avoid collision.

In the conventional tramcar equipped with the auxiliary carriage, that carriage stands in a stable manner, by itself, on the guide rail. More specifically, since the roller with vertical axes is held on the guide rail, it does not prevent the auxiliary carriage from falling down across the guide rail when only one wheel is in contact with the upper surface of the guide rail. Thus, it also cannot hold the auxiliary carriage by itself in a stable manner to prevent the same from falling down in the traveling direction. Therefore, two wheels have to be provided in the longitudinal direction, or a back-up roller should be placed in juxtapositic guide rail, so that the roller contacts the bottom surface of the guide rail. This is a serious drawback, because it requires a large structure and it is costly.

SUMMARY OF THE INVENTION

An object of the present invention is to eliminate the drawbacks of the prior art structures. This is done in one respect by part of the main body of the carriage being a rectangular frame surrounding a vertical opening when viewed from above, supporting on the frame surrounding of the opening. The rollers with vertical axes are supported on the frame, and the drive wheel and the follower wheel are fitted into the opening of the upper extended part of the main body frame.

Thus, now the torsional strength of the entire upper extending part is remarkably stronger in comparison to the prior art where the upper extending part supporting the steering rollers with vertical axes have only two extending, overhanging arms. Therefore, when the present invention is used in the tramcar for conveying large and heavy articles which place heavy loads on the load carrying platform the front and rear ends of which are supported by the upper ends of the powered carriage and the freely rolling carriage, with the aforementioned main body structure of the present invention there is a reduced a twist between the rollers with vertical axes for running on the guide rail. This means that the torsional deformation of the upper extending part is eliminated and thus damage to the upper extending part is prevented and the tramcar will also run smoothly.

Since the wheel units supporting the drive wheel and the follower wheel are detachably mounted to the main body of the carriage, taking-off the wheel units from the main body of the carriage enables the wheels to be easily and detachably mounted.

Another object of the present invention is to solve the drawbacks of the prior art by locating the upper ends of the wheel units which support the front and rear ends of the identical base of supporting the article to be conveyed at the same level, and by rotatably supporting the vertical shafts of the wheel units. This construction of the present invention is less costly and are simpler to assemble.

Furthermore, in accordance with the present invention the supporting units for carrying the load can also be separated from the carriages and placed on the floor in a stable manner with the load thereon.

Yet another object of the present invention is to eliminate the aforementioned drawbacks by an arrangement comprising front and rear vertical shafts for supporting the base that holds the article to be conveyed on the support units mounted on the wheel units of the trolleys so that the vertical shafts can be rotated over the guide rail, and mounting the control unit from the support unit on the power carriage, with the guide rail being located between the driven carriage and the control unit, and slidably mounting the pantograph collector in contact with the power feed lines on the guide rail carriage.

Since the large and heavy control unit and the pantograph collector are both mounted from the driven carriage rather than from the base supporting the article to be conveyed, the cable connecting the control unit to the motor for driving the wheel of the driven carriage, and the cable for connecting the control unit and the pantograph collector, cam be attached in a fixed manner and this permits a decrease of manufacturing costs, and the service life of the connection cable is extended.

Furthermore, the arrangement of the present invention mounts the control unit not to the side of the driven carriage that is opposite to the guide rail, but to the driven carriage so that the guide rail is located between the driven carriage and the control unit, resulting in an improvement in the crosswise balance of the driven carriage including the control unit. Furthermore, improved contact is provided between the rollers having vertical axes supported on the driven carriage, and the guide rail, and the tramcar travels more smoothly in addition to experiencing less damage by reduction of wear of the rollers and the guide rail.

A bracket for mounting the control unit is not provided directly on the power carriage, but in the present invention the control unit is pivotably mounted from the support unit of the power carriage at the base supporting the article to be conveyed, so the mounting of the control unit is simplified and can be achieved at lower cost.

According to a yet further object of the invention the monorail tramcar type conveyor has the auxiliary carriage connected through the connecting rod at least to either the driven carriage or the freely rolling carriage. The auxiliary carriage is provided with a detector for traveling control, wherein only one wheel is placed on the upper face of the guide rail, other than the roller with a vertical axis, and is supported by the auxiliary carriage. The connecting rod is arranged at the same height as the center of the aforementioned wheel, and both the ends of the connecting rod are connected to be movable only in a longitudinal direction relative to the carriage.

According to the construction of the present invention, the auxiliary trolley is pushed forward or pulled out by the connecting rod as the tramcar is traveling, the pushing forward or pulling out by the connecting rod occurring at the same height as the center of the wheel on the auxiliary carriage. Furthermore, the auxiliary carriage is allowed to move only in a longitudinal direction relative to the power carriage or the connecting rod, whereby the tramcar can travel smoothly without moving the auxiliary carriage back or forward, in a manner inclined to the center of the wheel. Thus, it is possible to construct the auxiliary trolley as small, light, and simple as possible thereby to reduce the costs of the conveying tramcar.

As the connecting rod can shift sideways from the position over the guide rail, it can access the level of the upper surface of the guide rail where the connecting rod is to the side of the upper surface of the guide rail. Thus the auxiliary carriage can be provided with a cleaning brush for the upper surface of the guide rail where the connecting rod is disposed to the side from the upper surface of the guide rail. This enables the auxiliary carriage to clean the upper surface of the guide rail. The connecting rod can be connected to the auxiliary carriage at the height of the wheel of the auxiliary carriage, only if the wheel is smaller in diameter.

DESCRIPTION OF THE DRAWING

The invention is described with reference being had to the drawing, wherein.

The suffixes "a" and "A" designate parts on the driven carriage at the front of the tram car, and corresponding to parts with the same reference numeral but with a suffix "b" or "B" on the freely rolling trolley at the rear of the tram car.

DETAILED DESCRIPTION OF THE INVENTION

Figure 1:
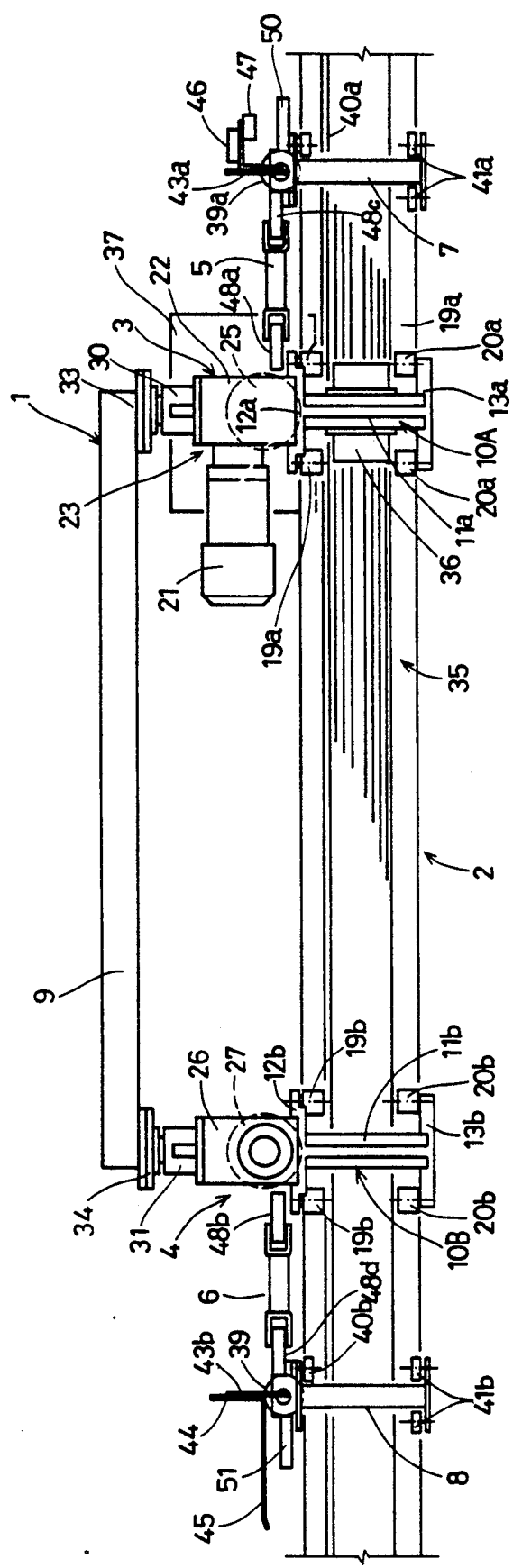
FIG. 1 is a side elevational view of an entire part of an embodiment of the present invention.
Figure 2:
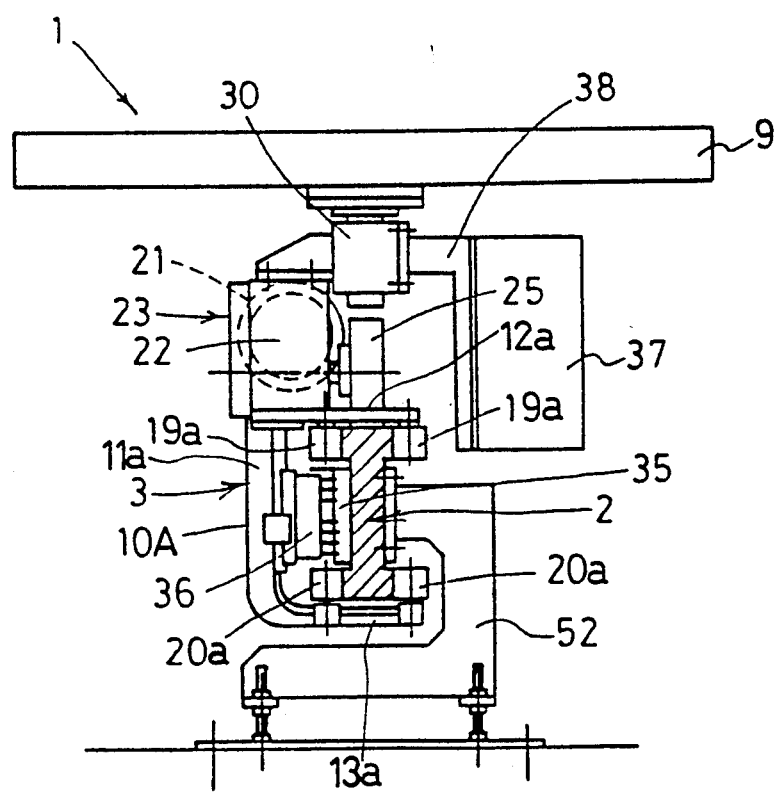
FIG. 2 is a front elevational view taken partly in cross-section, from the position of a driven carriage.
Figure 3:
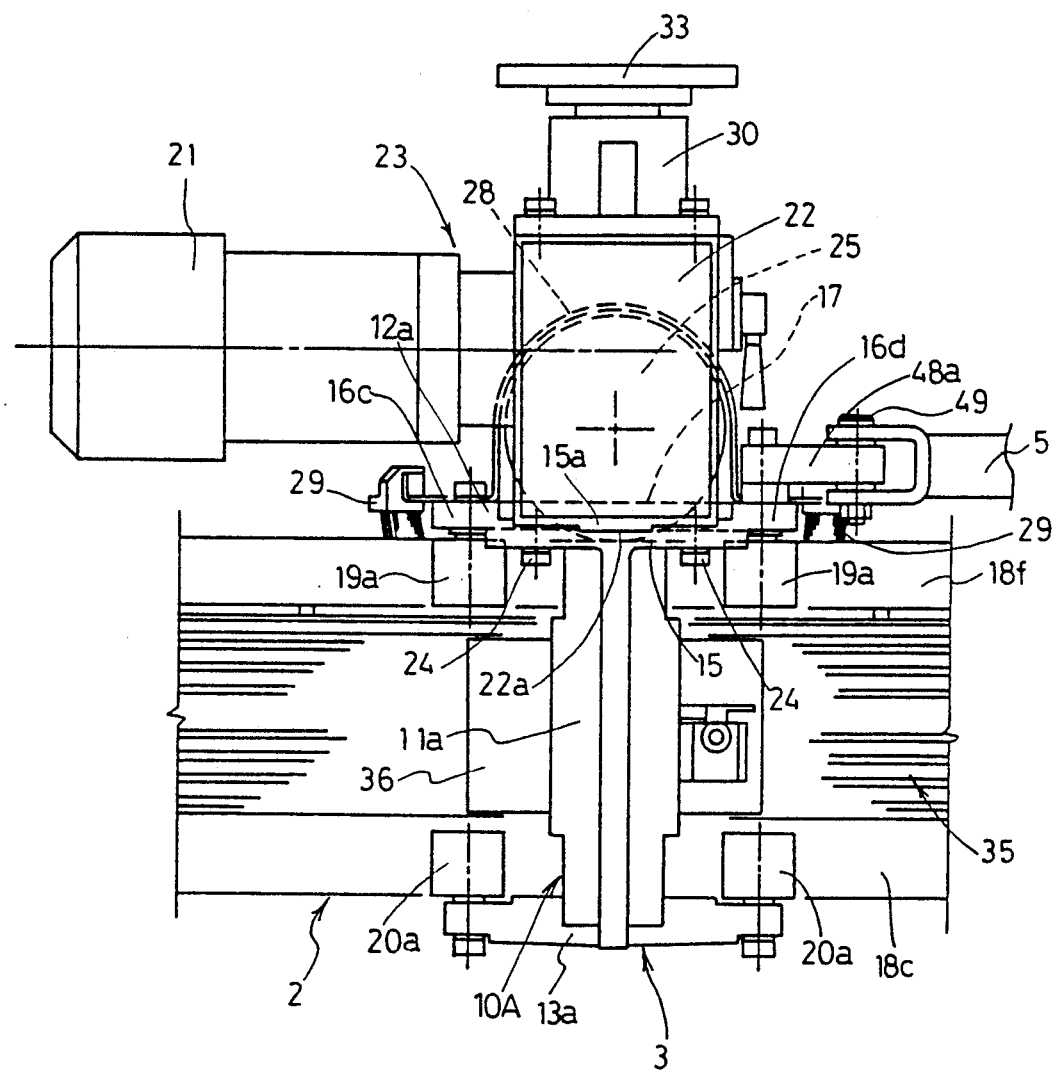
FIG. 3 is a side elevational view of a driven carriage.
Figure 4:
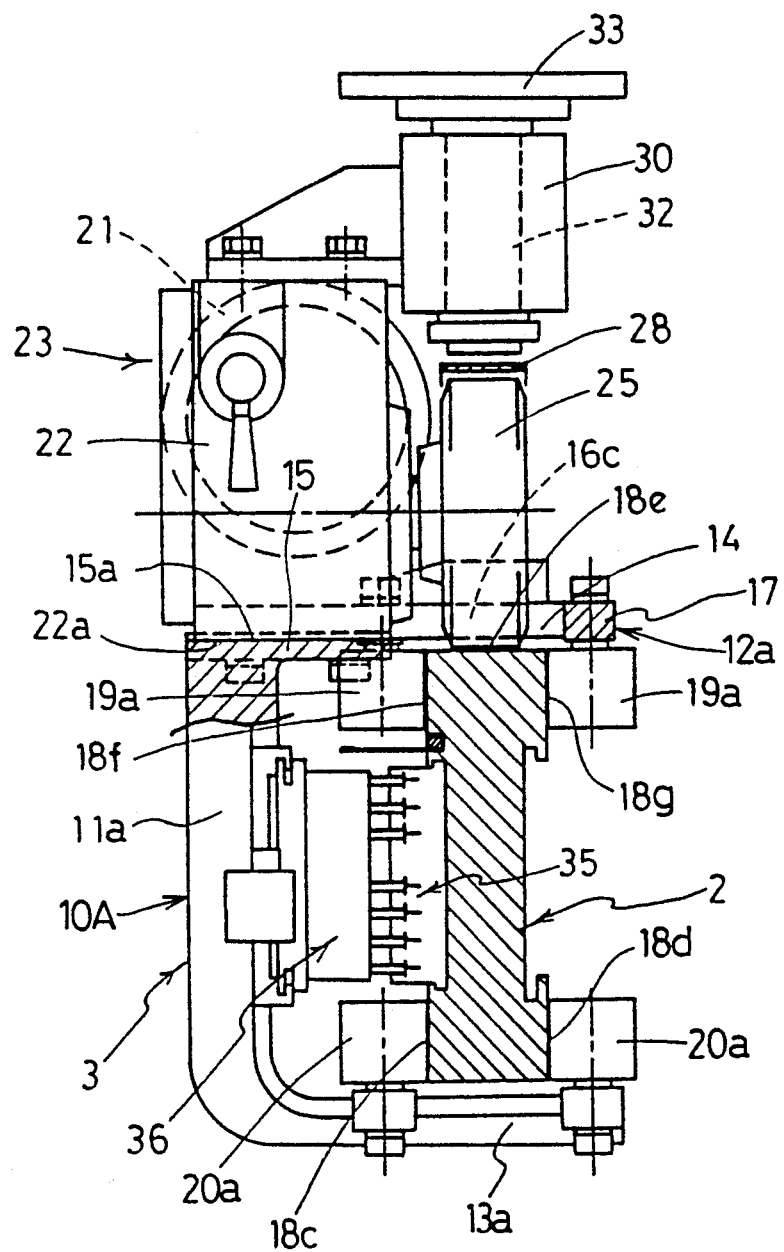
FIG. 4 is a front view, partly in cross-section of the same.

Referring to FIGS. 1 and 2, a conveying tramcar 1 is supported by a guide rail 2 for travel thereon. The tramcar 1 has a driven carriage 3, a freely rolling carriage 4, and front and rear auxiliary trolleys 7 and 8 are respectively connected by connecting rods 5 and 6 to the carriages 3 and 4. The trolleys are connected to a base supporting an article 9 to be conveyed. The front and rear ends of the article 9 are respectively supported by the driven carriage 3 and the freely rolling carriage 4.

The driven carriage 3 and the freely rolling carriage 4 are each connected to a respective main body 10a and 10b of carriages 3 and 4, respectively; both of said main bodies being identical to each other as to their structure and size. As shown in FIGS. 3-5 and 8, the main bodies 10A and 10B are each integrally formed and having substantially a U-shape when viewed from the front. The main bodies 10A and 10B each also have respective vertical support column portions 11a and 11b each located at one side of the guide rail 2, and respective rear and front upper wheel support portions 12a and 12b and respective rear and front lower wheel support portions 13a and 13b extend from the respective upper and lower ends of the respective rear and front vertical support column portions 11a and 11b towards the respective upper and lower sides of the guide rail 2. The upper wheel supports 12a and 12b are integrally formed into a rectangular frame-like shape having an opening 14 surrounded thereby and oriented vertically as shown in the plan view of FIG. 5 and the perspective view of FIG. 8, while the upper wheel support portions 12a and 12b each comprise a support part 15 on the upper end of the support column portions 11a and 11b, a front arm 16c and a rear arm 16d extend as one unit from the support part 15, and a connecting bridge 17 formed integrally between the ends of the arms 16c and 16d. The front and rear upper wheel support portions 12a and 12b are each provided with two pairs of rollers 19a and 19b being pivoted about vertical axes at four positions adjacent to the opening 14, and arranged to sandwich between them the upper front and rear sides 18f and 18g of the guide rail 12. The lower front and rear wheel supports 13a and 13b are each also provided with two pairs of rollers 20a and 20b for the same purpose as the pairs of rollers 19a and 19b of the upper wheel support portions 12a and 12b.

In the main bodies 10a and 10b a positioning groove 15a and 15b runs across the support part 15 in its full width. A reduction gear 22 is detachably mounted in the driven carriage 3 with mounting bolts 24 with a projecting portion 22a running crosswise engages the positioning groove 15a, so that they can slide crosswise in the upper end of the vertical support column of each carriage main body, and in the bottom of each wheel unit supported on the upper ends of the main bodies. The projecting portion is formed on the bottom of the reduction gear 22 disposed within a drive wheel unit 23 which also comprises an electric motor 21. The reduction gear 22 is fitted into the positioning groove 15a, and the drive wheel 25, mounted on an output shaft of the reduction gear 22 contacts the upper face of the guide rail 2 when the drive wheel 25 fits loosely into the opening 14 in the upper projected part 12 of the main body 10 of the carriage 3.

Similarly to the aforementioned structure of mounting the drive wheel unit 23 with its reduction gear 22 in the driven carriage 3, in the freely rolling carriage 4 the drive wheel unit 23 with its reduction gear 22, in the freely rolling carriage 4, a follower wheel unit 26 is detachably mounted on the support part 15 in the main body 10. A follower wheel 27 supported in the follower wheel unit 26 contacts the upper surface 18e of the guide rail 2, the follower wheel 27 fitting loosely into the opening 14 in the upper projected part 12 of the main body 10 of the carriage.

Circular cover plates 28 can be provided, if desired, for protecting the drive wheel 25 or the follower wheel 27, and a pair of front and rear cleaning brushes 29 are mounted on either or both carriages for cleaning the upper surface 18e of the guide rail 2 as the tramcar travels thereon.

Cantilevered load supporting units 30 and 31 are respectively provided on the driven carriage 3, the freely rolling carriage 4, on the upper end of the reduction gear 22 in the drive wheel unit 23 of the driven carriage 3, and the upper end of the follower wheel unit 26 in the freely rolling carriage 4. Vertical support shafts 32 are journaled closely over the guide rail 2 (FIG. 4), in respective mounting seats 33 and 34 for abutment of the front and rear ends of the load platform 9, and are rotatably supported by the platform supporting units 30 and 31. Under this arrangement the resulting structure is such that the upper end of the drive wheel unit 23 (the upper end of the reduction gear 22) of the driven carriage 3, and the upper end of the follower wheel unit 26 in the freely rolling carriage 4, are at the same level. In other words, the height of the follower wheel unit 26 is adapted to be disposed higher at a level coincides with the height of the reduction gear 22.

A pantograph collector 36 is in slidable contact with feed line unit 35 provided on one side of the guide rail 2 and is mounted on a vertical support column 11 in the main body carriage 10 of the driven carriage 3. As shown in FIGS. 1 and 2 (and omitted in FIG. 4), a control unit 37 is provided for driving the motor 21 of the drive wheel unit 23 by detecting, and signals supplied through the pantograph collector 36 from the feed line unit 35 is mounted by way of a mounting bracket 38 from the load supporting unit 30 on the side of the driven carriage 3, with the guide rail 2 being disposed between the control unit 37 and the drive wheel unit 23.

The auxiliary trolleys 7 and 8 (FIG. 1), are similar in structure and size to each other, and (FIGS. 6 and 7) equipped with a wheel 39 in contact with the upper end face 18e of the guide rail 2. Two rollers 40A and 40B with vertical axes contact the left and right sides 18f and 18g on the upper side of the guide rail 2. Further rollers 41a and 41b with vertical axes run along the bottom sides 18c and 18d on the lower side of the guide rail 2. If required, front and rear cleaning brushes 42 are provided for cleaning the upper side 18f of the guide rail 2.

Each of the auxiliary trolleys 7 and 8 have respective vertical mounting plates 43a and 43b extending crosswise relative to the guide rail 2. As shown in FIG. 1, the vertical mounting plate 43b of the rear auxiliary trolley 8 is equipped with a reflecting plate 44 having a rearward facing reflecting surface, for reflecting a light beam therefrom, and a magnetic plate 45 stretching out horizontally toward the rear. The vertical mounting plate 43a of the front auxiliary trolley 7 is equipped with a distance sensor 46 for reducing the speed. This sensor 46 comprises a reflecting type photoelectric sensor for detecting the reflection from the plate 44 in the rear auxiliary trolley 8 and then actuating a stopping proximity switch 47 when contacted by the magnetic plate 45 of another conveying tramcar.

Figure 5:
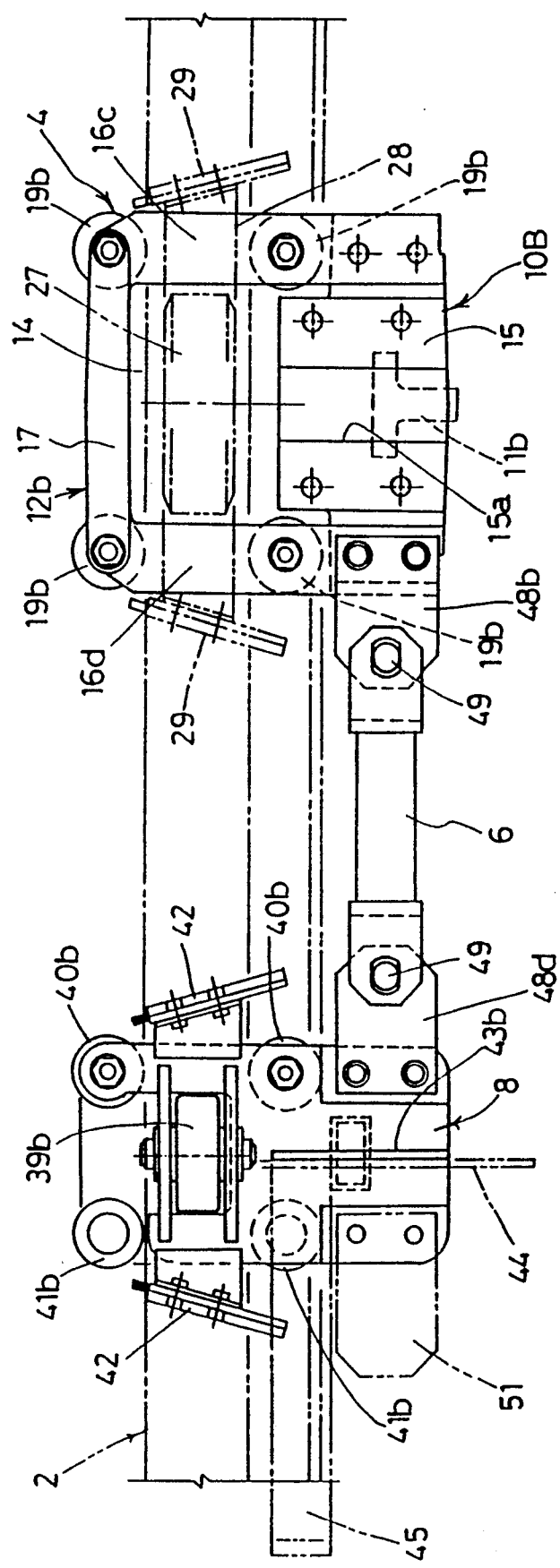
FIG. 5 is a plan view of a main body of trolley for a freely rolling carriage and a rear auxiliary trolley.
Figure 6:
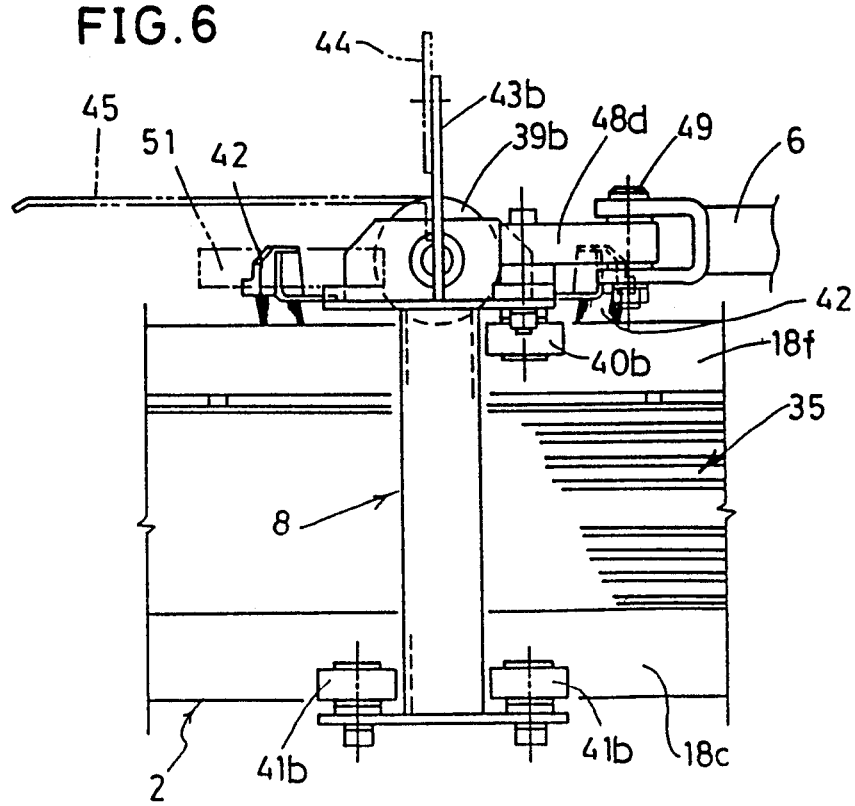
FIG. 6 is a side elevational view of the rear auxiliary trolley.
Figure 7:
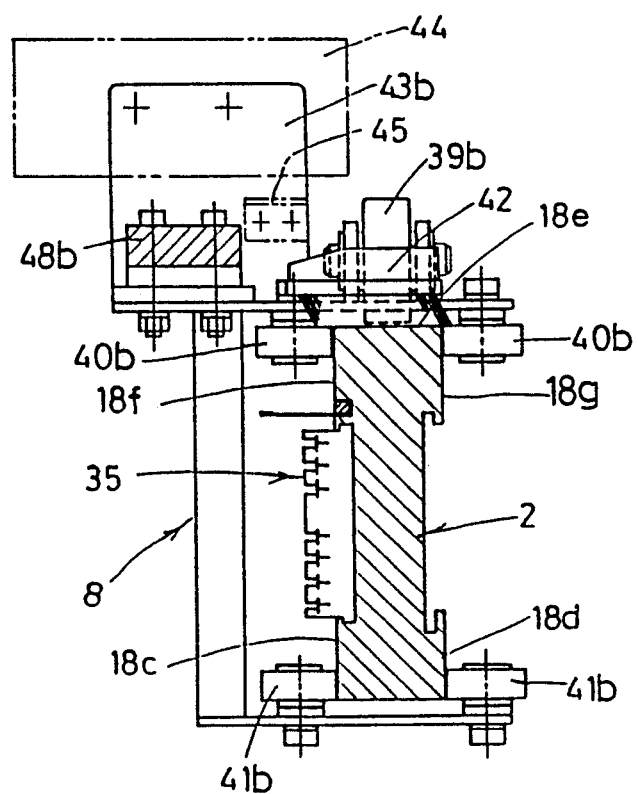
FIG. 7 is a front elevational view, partly in cross-section, of the same.
Figure 8:
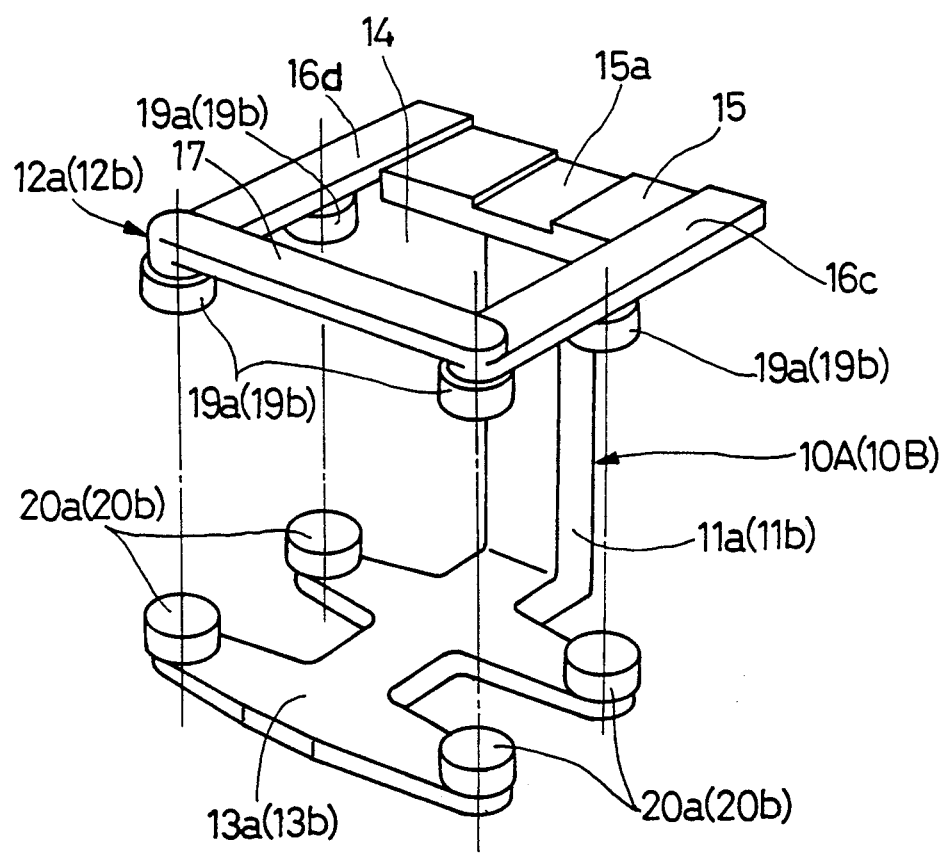
FIG. 8 is a perspective view of a main body of a trolley.

As shown in FIGS. 1, 5, and 6, between the carriages 3 and 4, and auxiliary trolleys 7 and 8, connecting brackets 48a and 48b is mounted at approximately the height of the level of the center of a wheel 39 in each of the auxiliary carriages 7 and 8 in the area to the side of the guide rail 2, and each of the ends of the connecting rods 5 and 6 is connected by vertical pins 49 to the connecting brackets 48 so that both of the ends of the connecting rods 5 and 6 can be rotated across the axial direction of the guide rail 2. The auxiliary carriages 7 and 8 are equipped with collision brackets 50 and 51 which can collide against a like element of another tramcar.

As shown in FIG. 2, a mounting bracket 52 is provided for at a level sufficiently above the floor. Mounting brackets 52 are located spaced apart from each other and support one side of the guide rail 2, that is opposite to the side thereof to which the feed line unit 35 is attached.

The conveying tramcar 1 of the present invention actuates the electric motor 21 of the driven carriage 3 by means of the control unit 37 and the control signals supplied from the pantograph collector 36 from the feed line unit 35, whereby the drive wheel 25 is driven to travel along the guide rail 2, and the article to be conveyed placed on the supporting bases 33 and 34, can be conveyed thereby.

When the front and rear auxiliary carriages 7 and 8 are pushed back or pulled out by the respective connecting rods 5 and 6, they travel together with the driven carriage 3, and the freely rolling carriage 4 along the guide rail 2. Their travel takes place smoothly, without longitudinal action thereof. The wheels 39a and 39b stay in the center, supported on the guide rail 2 regardless of the units being pushed back or pulled out by the connecting rods 5 and 6, because these connecting rods are located approximately at the level of the center of the wheel 39, therefore their respective centers of gravity are sufficiently lower than that of the wheel 39. Thus, only their horizontally forward and backward movement is permitted around the vertical pins 49 relative to the driven carriage 3 and the freely rolling carriage 4.

On a horizontally curved part of the guide rail 2, each of the carriages 3, 4, and trolley 7, and 8 moves along the curved part by each of the rollers with vertical axes 19, 20, 40, and 41. The movements of the driven carriage 3, and the freely rotating carriage 4 takes place by rotation around vertical support shafts 32 for the supporting bases for article 9 to be conveyed. The auxiliary carriage 7 and 8 are driven through, and can rotate about, the vertical pins 49 of the connecting rods to the driven carriage 3 and the freely rotating carriage 4, respectively.

We claim:

1. A monorail tramcar type conveyor, comprising a guide rail having an upper face, a driven carriage with a driving wheel unit containing a drive wheel rotatable on said upper face, the driven carriage also having a first main body with the drive wheel unit being supported on the upper end of the first main body, a freely rolling carriage having a follower wheel unit which contains a follower wheel rotatable on said guide rail, the freely rolling carriage having a second main body which support the follower wheel unit supported on the upper end of the second main body, and a load platform on each carriage for supporting an article to be conveyed, said load platform having front and rear ends supported by respective tops of said carriages, the tops being rotatable about vertical support shafts, the first and second main bodies of the carriages each comprising a vertical support column on one side of the guide rail, and integral upper and lower cantilevering parts projecting outwardly from the respective upper and lower ends of said vertical support column respectively toward the upper and lower sides of the guide rail, with rollers having vertical axes adapted to roll along the respective upper and lower sides of the guide rail and being supported from the upper and lower projected parts, said upper projected part of each of the main bodies forming a substantially rectangular frame with an opening therein, the center of said frame being open in the vertical direction, said rollers with vertical axes being mounted in each of said main bodies surrounding the vertical opening, and the drive wheel and follower wheel are loosely fitted in said opening between the upper cantilevered parts of the frame of each main body.

2. The monorail tramcar conveyor of claim 1, further comprising grooves and projected portions engaged with each other so that they are slidable in a crosswise direction relative to each other in the upper end of the vertical support column of each of said main bodies of the carriages.

3. The monorail tramcar conveyor of claim 1, wherein the upper ends of the wheel units are of the same height, and platform supporting units are detachably mounted on the upper ends of the wheel units, wherein the front and rear ends of the load platform are supported on respective platform supporting units, whereby the carriages are adapted to swivel about respective vertical support shafts relative to the load platform.

4. The monorail conveyor of claim 1, wherein said vertical support shafts are front and rear support shafts supported in holding units mounted from said wheel units of each of said carriages so that the vertical support shafts are rotatable over the guide rail, power feed lines mounted above said guide rail, a control unit adapted to be powered from said power feed lines and being mounted from the vertical column at the side of the driven carriage with the guide rail being disposed between the driven carriage and said power feed lines, and a pantograph collector for said driven carriage in slidable contact with said power feed lines.

5. In a monorail tramcar conveyor having a guide rail, having a driven carriage on the guide rail, the driven carriage having a drive unit which has a drive wheel that is rotatable on the guide rail, a freely rotating carriage comprising a follower wheel unit having a follower wheel that is rotatable on the guide rail, and a base on each of the carriages for supporting an article to be conveyed, the front and rear ends of each base being rotatable about respective vertical support shafts, the conveyor further having at least one auxiliary trolley connected by a connecting rod to either the driven carriage or the freely rotating carriage, or to both said driven carriage and said freely rotating carriage, each auxiliary trolley having a travel controlling detector or a part to be detected by another travel controlling detector, or both a travel controlling detector and a part to be detected by another travel controlling detector, the improvement wherein the auxiliary trolley has a wheel adapted to roll on the upper surface of the guide rail, the connecting rod is connected at about the level of the center of said wheel, and ends of each of the connecting rods are connected to each of said carriages so that the ends of each connecting rod are horizontally movable relative to said carriages.

6. The monorail tramcar conveyor of claim 5, wherein each of said connecting rods is adapted to be shifted laterally from a position over said guide rail.

* * * * *